US012511556B2

(12) United States Patent
Kou et al.

(10) Patent No.: US 12,511,556 B2
(45) Date of Patent: Dec. 30, 2025

(54) SCHEDULING ML SERVICES AND MODELS WITH HETEROGENEOUS RESOURCES (71) Applicants: Baidu USA LLC, Sunnyvale, CA (US); Baidu.com Times Technology (Beijing) Co., Ltd., Beijing (CN)

(72) Inventors: Haofeng Kou, Sunnyvale, CA (US); Davy Huang, Sunnyvale, CA (US); Manjiang Zhang, Sunnyvale, CA (US); Xing Li, Sunnyvale, CA (US); Lei Wang, Beijing (CN); Huimeng Zheng, Beijing (CN); Zhen Chen, Beijing (CN); Ruichang Cheng, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 881 days.

(21) Appl. No.: 17/782,616

(22) PCT Filed: Apr. 15, 2022

(86) PCT No.: PCT/CN2022/087176
§ 371 (c)(1),
(2) Date: Jun. 3, 2022

(87) PCT Pub. No.: WO2023/197316
PCT Pub. Date: Oct. 19, 2023

(65) Prior Publication Data
US 2024/0185098 A1    Jun. 6, 2024

(51) Int. Cl.
*G06N 5/04*    (2023.01)

(52) U.S. Cl.
CPC .................................. *G06N 5/04* (2013.01)

(58) Field of Classification Search
CPC ....................................................... G06N 5/04
See application file for complete search history.

(56) References Cited

U.S. PATENT DOCUMENTS

| 10,685,295 B1* | 6/2020 | Ross | G06N 20/00 |
| 2021/0357256 A1* | 11/2021 | Cao | G06F 18/24 |
| 2022/0083389 A1* | 3/2022 | Poothia | G06F 9/5027 |

* cited by examiner

*Primary Examiner* — Eric J. Bycer
(74) *Attorney, Agent, or Firm* — WOMBLE BOND DICKINSON (US) LLP (57) ABSTRACT

A system determines a timing matrix corresponding to inference times taken for a number of machine learning (ML) models to be executed by a number of processing resources of a computing device. The processing resources includes at least a first and a second type of processing resources. The system applies a service-specific model-first scheduling scheme or a service-specific hardware-first scheduling scheme to obtain corresponding service-specific mappings. The system determines a best mapping from the corresponding service-specific mappings. The system schedules each of the ML models to a corresponding processing resource from the processing resources according to the best mapping. The system executes the ML models using corresponding mapped processing resources.

20 Claims, 10 Drawing Sheets

|     | Model 1 | Model 2 | Model 3 | Model 4 | Model 5 |
|-----|---------|---------|---------|---------|---------|
| CPU | 8       | 241     | 212     | 265     | 241     |
| GPU | 37      | 370     | 514     | 151     | 389     |
| VPU | 12      | 399     | 345     | 185     | 317     |

|     | Model 6 | Model 7 | Model 8 |
|-----|---------|---------|---------|
| CPU | 3       | 132     | 116     |
| GPU | 117     | 198     | 113     |
| VPU | 4       | 168     | 111     |

|     | Model 9 | Model 10 | Model 11 |
|-----|---------|----------|----------|
| CPU | 65      | 217      | 76       |
| GPU | 131     | 311      | 199      |
| VPU | 37      | 406      | 164      |

|     | Model 1 | Model 2 | Model 3 | Model 4 | Model 5 | Model 6 | Model 7 | Model 8 | Model 9 | Model 10 | Model 11 |
|-----|---------|---------|---------|---------|---------|---------|---------|---------|---------|----------|----------|
| CPU | 8       | 241     | 212     | 265     | 241     | 3       | 132     | 116     | 65      | 217      | 76       |
| GPU | 37      | 370     | 514     | 151     | 389     | 117     | 198     | 113     | 131     | 311      | 199      |
| VPU | 12      | 399     | 345     | 185     | 317     | 4       | 168     | 111     | 37      | 406      | 164      |

Figure 5D

| Model Name | MFS | HFS |
|---|---|---|
| Model 1 | GPU | GPU |
| Model 2 | VPU | VPU |
| Model 3 | VPU | VPU |
| Model 4 | CPU | CPU |
| Model 5 | VPU | VPU |

Figure 6A

| Model Name | MFS | HFS |
|---|---|---|
| Model 1 | VPU | VPU |
| Model 2 | VPU | VPU |
| Model 3 | VPU | VPU |
| Model 4 | VPU | CPU |
| Model 5 | VPU | VPU |
| Model 6 | GPU | GPU |
| Model 7 | VPU | VPU |
| Model 8 | VPU | VPU |
| Model 9 | CPU | VPU |
| Model 10 | VPU | VPU |
| Model 11 | VPU | VPU |

SCHEDULING ML SERVICES AND MODELS WITH HETEROGENEOUS RESOURCES

CROSS-REFERENCE TO RELATED APPLICATION

This application is a National Stage of International Application No. PCT/CN2022/087176, filed Apr. 15, 2022, which is hereby incorporated by reference in its entirety.

TECHNICAL FIELD

Embodiments of the invention relate generally to scheduling of machine learning (ML) services and models. More particularly, embodiments of the invention relate to scheduling ML services and models with heterogeneous resources.

BACKGROUND

The research of Deep Neural Networks (DNNs) has been gaining ever-increasing impetus due to their state-of-the-art performance across diverse application scenarios. Each year, a multitude of new DNN architectures are proposed for the emerging intelligent services with more stringent requirements related to improvements in accuracy, latency reduction, privacy preservation, energy efficiency, etc. Most of the DNNs focus on boosting accuracy at the expense of substantially increased model complexity—the depth of the current state-of-the-art neural network models, such as Inceptionv4 and ResNet-50, can reach dozens or even hundreds of layers to outperform previous neural network models for related tasks in accuracy. A single layer may require up to millions of matrix multiplications. Such calculation presents challenges to deployment of these DNN models on edge devices with limited computation resources.

Edge computing generally refers to the implementation and use of computing and resources at locations closer to the "edge" or collection of "edges" of the network. The purpose of this arrangement is to reduce application and network latency, improve service capabilities, and improve compliance with security or data privacy requirements. Components that can perform edge computing operations ("edge nodes") can reside at locations at the edge of the network (e.g., in a high performance computing data center or cloud installation; a designated edge node server, an enterprise server, a roadside server, a consumer device, or an internet of things (IOT) device providing or consuming edge services).

Typically, ML applications/services require a stringent latency, which leads to the prevalent many-to-many problem (multi-application with multi-models on heterogeneous edge devices) when the ML services are provided by an edge device. A need arises for AI-driven applications/services to allocate multi-models to heterogeneous resources of edge devices to achieve a low latency.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments disclose a resource mapping system to map heterogeneous processing resources to machine learning (ML) models to execute ML/AI-driven applications or provide ML/AI-driven services. The resource mapping system can evaluate and/or allocate ML models to processing resources of an edge device according to a model-first scheme or a hardware-first scheme. The resource mapping system is adaptive to multiple ML applications and/or multiple ML models to allocate processing resources to a group of ML models for sequential or concurrent execution.

Existing research focuses on a particular ML model to improve the ML model's accuracy and performance, but if the ML model is deployed on an inappropriate resource at an edge device, its inference time may unnecessarily exceed by orders of magnitude. Moreover, due to differences in hardware configurations/device drivers, even with two similar edge devices, the inference latency of a ML model may differ. Furthermore, there might be a non-negligible relationship between ML applications/models in the real-world applications. For example, the output of one ML model might be the input of several ML models and several ML models might be executed for a single task of the ML application/service. Certain real-time application requirements and the availability of different processing resources including central processing units (CPU), vision processing units (VPU), or graphical processing units (GPU) and so on, of an edge device, brings challenges to allocating the processing resources for multiple ML applications/services.

According to some embodiments, a system to map processing resources is disclosed. The system determines a timing matrix corresponding to inference times taken for a number of machine learning (ML) models to be executed by a number of processing resources of a computing device. The processing resources includes at least a first and a second type of processing resources. The system applies a service-specific model-first scheduling scheme or a service-specific hardware-first scheduling scheme based on the timing matrix to obtain corresponding service-specific mappings. The system determines a best mapping from the corresponding service-specific mappings. The system schedules each of the ML models to a corresponding processing resource from the processing resources according to the best mapping. The system executes the ML models using corresponding mapped processing resources.

Figure 1:
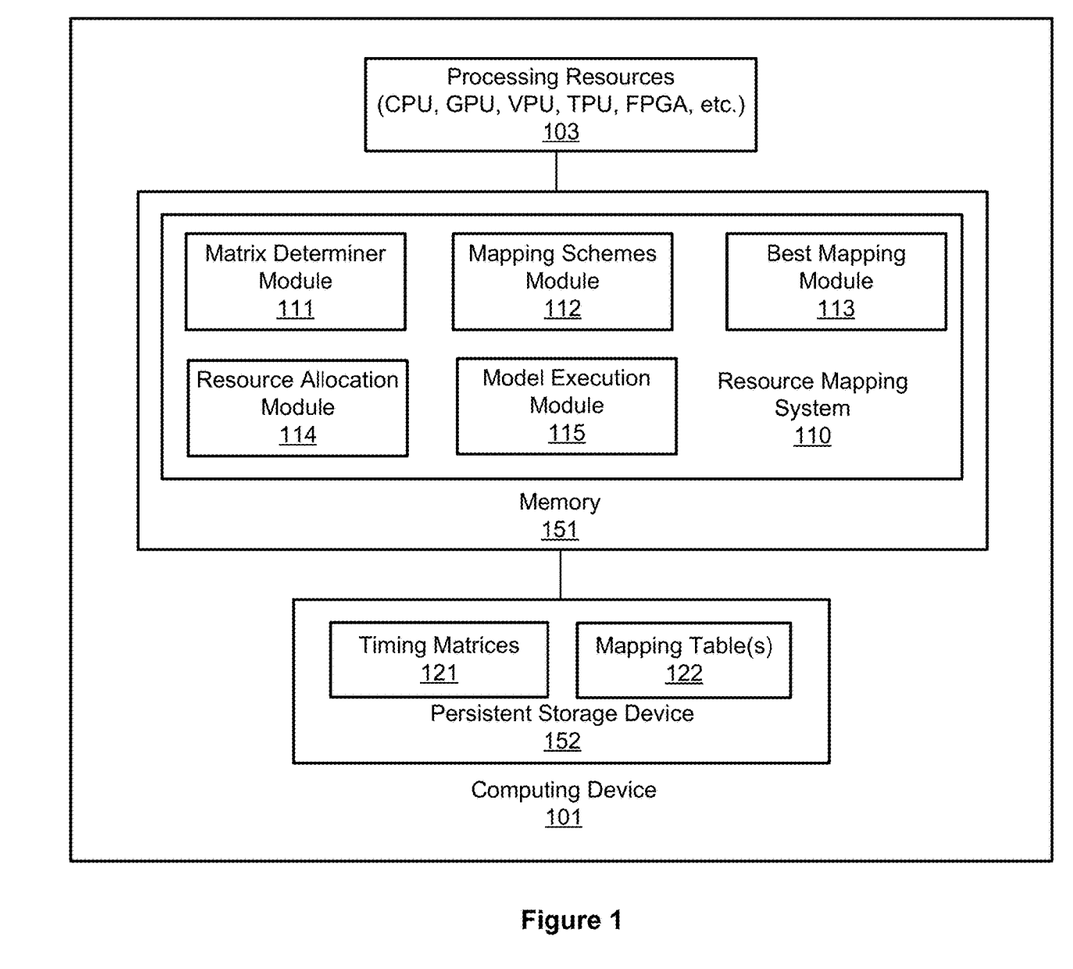
FIG. 1 illustrates an example of a computing device according to one embodiment.

FIG. 1 illustrates an example of a computing device 101 according to one embodiment. Computing device 101 may be wearable computing devices (e.g., smart watch, glasses, clothes), personal computing devices (e.g., mobile phone, tablet, laptop), home devices (e.g., appliances, thermostats, light systems, security system), advertising devices (e.g., billboards, information kiosks), recording devices (e.g., digital cameras, video cameras, audio recorders), city management devices (e.g., parking sensors, traffic sensors, water quality devices), vehicles (e.g., cars, trucks, airplanes), body sensors (e.g., activity sensors, vital signs sensor, pedometers), environmental sensors (e.g., weather sensors, pollution sensors, air quality sensors), internet of things (IOT) devices, etc. Computing device 101 may include resource mapping system 110. Resource mapping system 110 can determine a processing resource schedule for one or more ML services/applications, each ML service/application invoking one or more ML models to complete the tasks of the ML service/application.

Resource mapping system 110 may include matrix determiner module 111, mapping schemes module 112, best mapping module 113, resource allocation module 114, and model execution module 115. Matrix determiner module 111 can determine a two dimensional (ML models versus processing resources) matrix to run multiple ML services/applications on computing device 101. The matrix can be stored at timing matrix 121. Matrix determiner module 111 can determine a submatrix for each ML service/application. Mapping schemes module 112 can determine optimized mappings of ML models to processing resources using a hardware first scheme (HFS) or a model first scheme (MFS), as further described in FIGS. 2-5. The mappings can be stored at mapping table(s) 122. The HFS or MFS can be evaluated for a particular ML service (e.g., service-specific) or a combination of ML services (e.g., service-agnostic). Best mapping module 113 can determine a best mapping from either the HFS or MFS. Resource allocation module 114 can allocate processing resources (central processing unit (CPU), graphic processing unit (GPU), tensor processing unit (TPU), vision processing unit (VPU), field programmable gate array (FPGA), etc.) to ML models according to a mapping scheme. Model execution module 115 can execute a model using a mapped processing resource.

CPU is a main processor that executes basic instructions of a computer program. GPU is a specialized processor designed to accelerate graphics rendering. VPU is a type of microprocessor aimed at accelerating machine learning and artificial intelligence for tasks like image processing. VPU can take the load off the CPU by assigning tasks to an application-specific co-processor for object, facial recognition and machine earning functions using less heat and power than a GPU. Examples of VPU are INTEL MOVIDIUS, MYRIAD. TPU is application-specific integrated circuits (ASICs) used to accelerate machine learning (ML) workloads. FPGA is a semiconductor device that are based on a matrix of configurable logic blocks connected via programmable interconnects. FPGA can be configured for application-specific tasks. Although CPU, GPU, VPU, TPU, FPGA are shown for processing resource 103, other types of processing accelerators can be used for the processing resources.

Some or all of modules 111-115 may be implemented in software, hardware, or a combination thereof. For example, these modules may be installed in persistent storage device 152, loaded into memory 151, and executed by one or more processing resources (e.g., processors). Note that some or all of these modules may be communicatively coupled to a network. Some of modules 111-115 may be integrated together as an integrated module.

Figure 2:
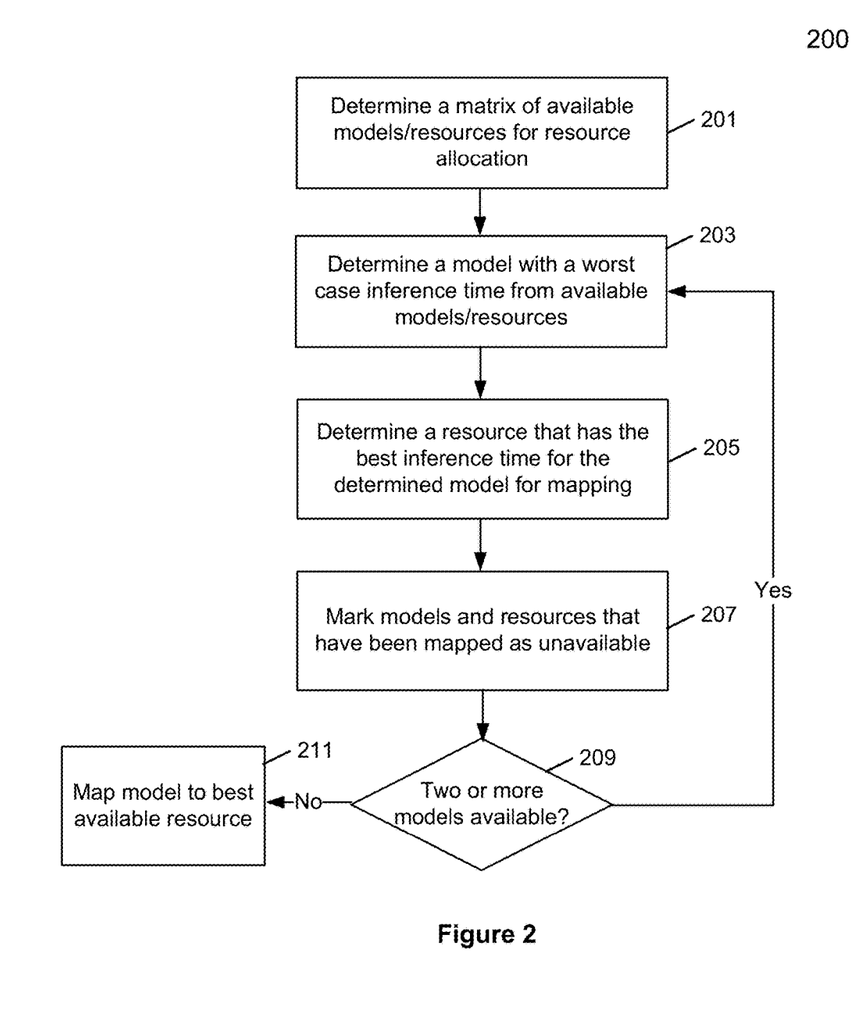
FIG. 2 is a block diagram illustrating a process for a model first scheduling (MFS) scheme according to one embodiment.

FIG. 2 is a block diagram illustrating a process for a model first scheduling (MFS) scheme according to one embodiment. Process 200 may be performed by processing logic which may include software, hardware, or a combination thereof. For example, process 200 may be performed by computing system 101 of FIG. 1.

Figure 5A:
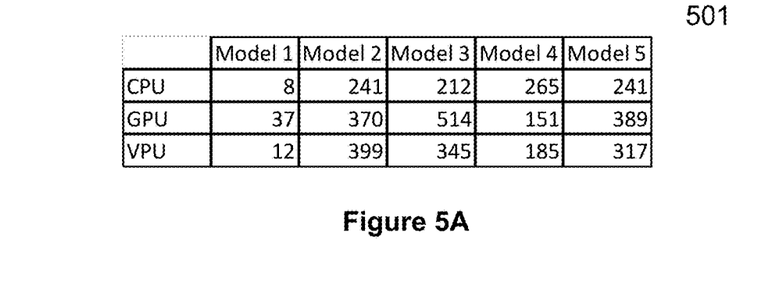
FIGS. 5A-5D illustrate examples of model-resource matrices for some ML services according to one embodiment.
Figure 5B:
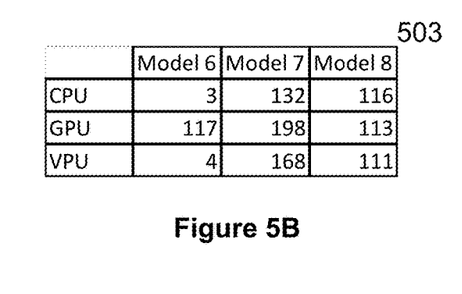
Figure 5C:
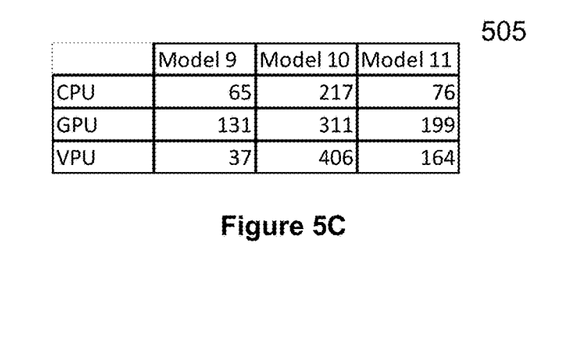
Figure 5D:
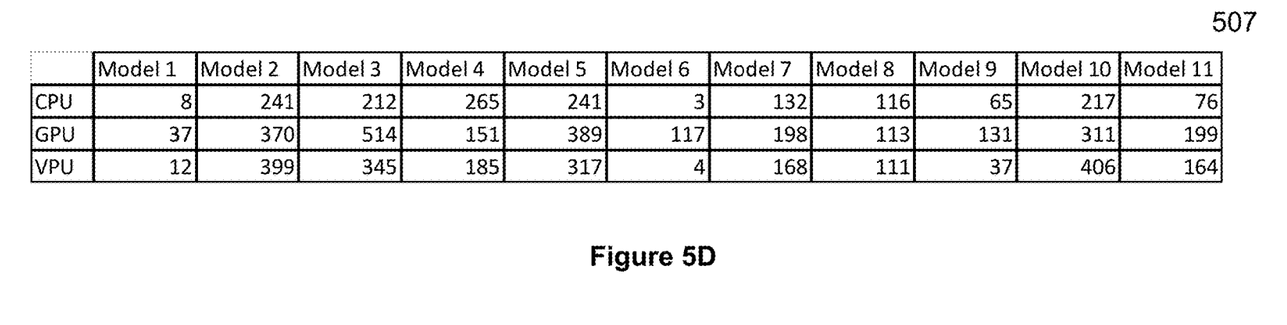

Referring to FIG. 2, at block 201, processing logic determines a matrix of models/resources for resource allocation. The matrix can have time information for ML models/processing resources pairs of a computing device. The timing information can be expressed in frames per second (FPS), absolute inference time in millisecond (ms), or other time values, etc. indicating the inference time of each ML model executed on a respective processing resource. In one embodiment, the matrix can be service specific or service agnostic. Examples of matrices for service-specific ML services are shown in FIGS. 5A-5C, corresponding to service A, B, C, respectively. The matrix of FIG. 5D can be service agnostic and correspond to the combination of services A-C.

The timing information, as tabulated in FIGS. 5A-5D, can be derived by recording inference times of individual ML models using a corresponding processing resource for computing device 101. In some embodiment, the inference times can be recorded by executing the ML models on a reference device that is similar to device 101. In one embodiment, FIGS. 5A-5D indicate timing information in FPS values.

At block 203, processing logic determines a model with a worst case inference time from available models/resources. For example, using service A or matrix 501 of FIG. 5A, the worst case in the matrix is 8 FPS corresponding to model 1, and model 1 is determined to have a worst case inference time.

At block 205, processing logic determines a resource that has the best inference time for the determined model for mapping. For example, for the determined model 1, the best case is 37 FPS executing model 1 on a GPU resource. Thus, model 1 is mapped to GPU for resource allocation and model execution.

At block 207, processing logic marks models and resources that have been mapped as unavailable. For example, the row corresponding to GPU, and the column corresponding to model 1 are removed for subsequent mappings. Note that, the computing device 101 or matrix

501 of FIG. 5A has one count of CPU resource, one count of GPU resource, and eight counts of VPU resources for the MFS/HFS analyses. If there are more than one available GPU resources, the GPU row remains in matrix 501 until all GPU resources are exhausted.

At block 209, processing logic evaluates if there are two or more available models for evaluation. If yes, processing logic proceeds to block 203. Here, models 2-5 are still available and processing logic proceeds to block 203.

During a subsequent iteration, at block 203, processing logic determines a next worst case to be 185 FPS for model 4. At block 205, processing logic determines CPU to have the best FPS (265) when mapped to model 4. At block 207, processing logic marks and removes CPU and model 4 from subsequent mappings. Note that, if there are more than one available CPU resources, the CPU row remains in matrix 501 until all CPU resources are exhausted. At block 209, processing logic evaluates models 2-3, and 5 are still available for mapping and proceeds to block 203.

During a subsequent iteration, at block 203, processing logic determines a next worst case to be 317 FPS for model 5. At block 205, processing logic determines VPU to have the best FPS when mapped to model 5. Here, only VPU resources are left and VPU resource has 8 available units in this scenario. At block 207, processing logic marks and removes model 5 from subsequent mappings. At block 209, processing logic determines that models 2-3 are still available and proceeds to block 203.

During a subsequent iteration, at block 203, processing logic determines a next worst case to be 345 FPS for model 3. At block 205, processing logic determines VPU to have the best FPS when mapped to model 3. Here, only VPU resources are available. At block 207, processing logic marks and removes model 3 from subsequent mappings. At block 209, processing logic determines model 2 is available and proceeds to block 211.

At block 211, model 2 is mapped to VPU for a 399 FPS to complete the service-specific (service A) MFS mapping. The completed MFS mapping is shown in mapping 601 of FIG. 6A. Similar MFS mappings can be determined for services B, C, or a combination of the services A-C.

Figure 3:
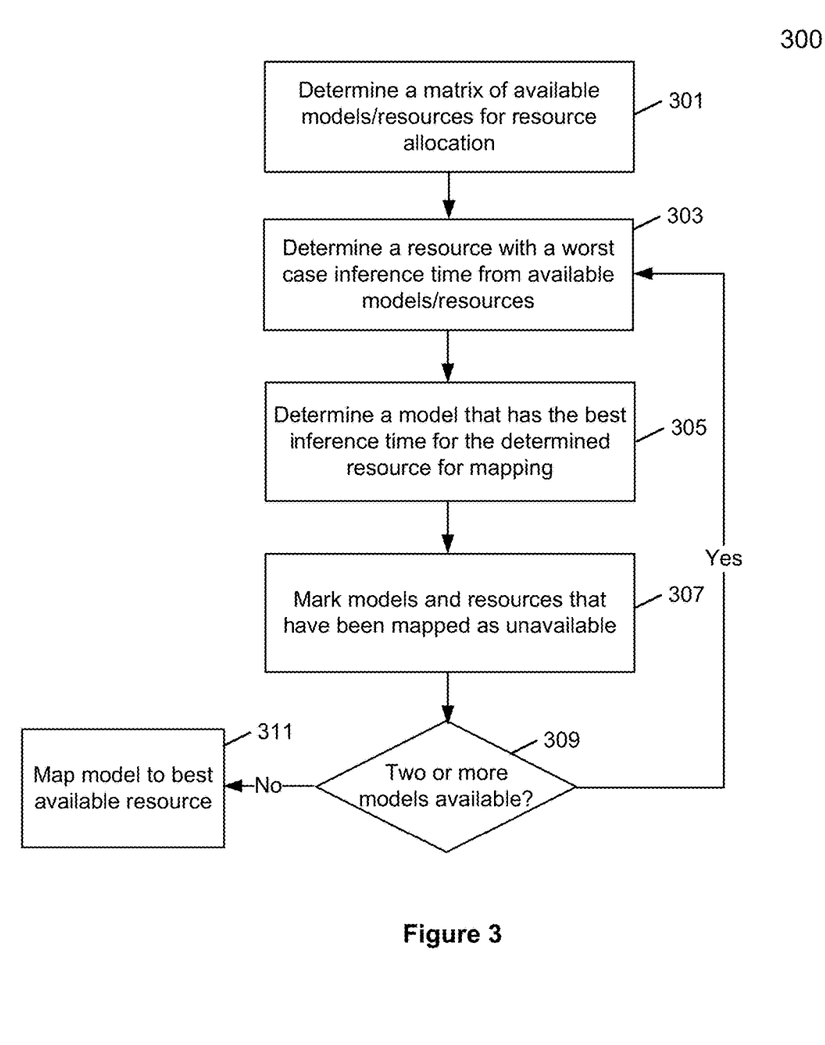
FIG. 3 is a block diagram illustrating a process for a hardware first scheduling (HFS) scheme according to one embodiment.

FIG. 3 is a block diagram illustrating a process for a hardware first scheduling (HFS) scheme according to one embodiment. Process 300 may be performed by processing logic which may include software, hardware, or a combination thereof. For example, process 300 may be performed by computing system 101 of FIG. 1.

Referring to FIG. 3, at block 301, processing logic determines a matrix of models/resources for resource allocation. The matrix can have time information for ML models executed by available processing resources in a computing device. The timing information can be expressed in frames per second (FPS), absolute inference time in millisecond (ms), or other time values, etc. In one embodiment, the matrix can be service specific or service agnostic.

At block 303, processing logic determines a processing resource with a worst case inference time from available models/resources in the matrix.

For example, using service A or matrix 501 of FIG. 5A, the worst case in the matrix is 8 FPS corresponding to the CPU resource executing model 1, thus, the CPU resource is determined to have a worst case inference time.

At block 305, processing logic determines a model that has the best inference time for the determined resource for mapping.

For example, for the CPU resource, the best case FPS of 265 corresponds to executing model 4. Thus, model 4 is mapped to the CPU resource for resource allocation and model execution.

At block 307, processing logic marks models and resources that have been mapped as unavailable.

For example, the row corresponding to CPU, and the column corresponding to model 4 are marked and removed for subsequent mappings. Note that, the example of FIG. 5A has one count of CPU resource, one count of GPU resource, and 8 counts of VPU resources. If there are more than one available CPU resources, the CPU row would remain in matrix 501 until all CPU resources are exhausted.

At block 309, processing logic evaluates if there are two or more available models for evaluation. If yes, processing logic proceeds to block 303. Here, there are available models 1-3, and 5, and processing logic proceeds to block 303.

During a subsequent iteration, at block 303, processing logic determines a next worst case to be 12 FPS for VPU executing model 1. At block 305, processing logic determines model 2 to have the best FPS (e.g., 399) when mapped to a VPU resource. At block 307, processing logic marks and removes model 2 from subsequent mappings. Note that here the VPU resource count is 8 and thus VPU resource remains in matrix 501. At block 309, processing logic evaluates that models 1, 3, and 5 are still available for mapping and proceeds to block 303.

During a subsequent iteration, at block 303, processing logic determines a next worst case to be 12 FPS for VPU resource executing model 1. At block 305, processing logic determines VPU to have the best FPS of 345 when mapped to model 3. At block 307, processing logic marks and removes model 3 from subsequent mappings. At block 309, processing logic evaluates models 1 and 5 remains available and processing logic proceeds to block 303.

During a subsequent iteration, at block 303, processing logic determines a next worst case to be 12 FPS for VPU resource executing model 1. At block 305, processing logic determines VPU to have the best FPS of 317 when mapped to model 5. At block 307, processing logic marks and removes model 5 from subsequent mappings. At block 309, processing logic evaluates that model 1 remains available and processing logic proceeds to block 311.

At block 311, model 1 is mapped to GPU for a 37 FPS since VPU only provides 12 FPS, to complete the service-specific (e.g., service A) HFS mapping. The completed HFS mapping is shown in mapping 601 of FIG. 6A. Similar HFS mappings can be determined for services B, C, or a combination of the services A-C.

Figure 4:
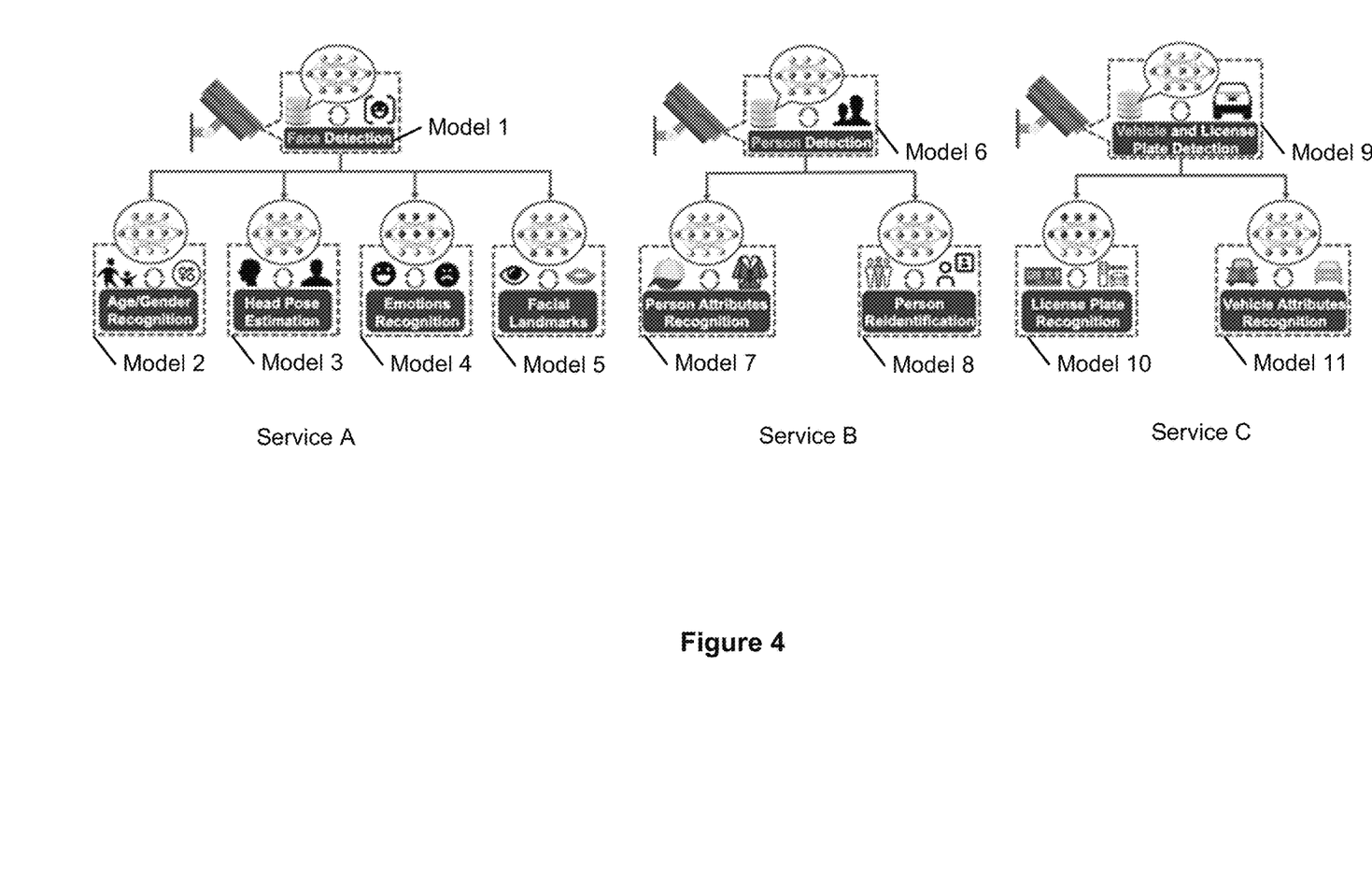
FIG. 4 illustrates examples of ML services according to one embodiment.

FIG. 4 illustrates examples of ML services according to one embodiment. For example, service A correspond to facial recognition. Service A can include ML models 1-5, corresponding to models for face detection, age/gender recognition, head pose estimation, emotions recognition, and/or facial landmarks, respectively. Service B can include ML models 6-8, corresponding to models for person detection, person attributes recognition, and/or person re-identification, respectively. Service C can include ML models 9-11, corresponding to models for vehicle and license plate detection, license plate recognition, and/or vehicle attributes recognition, respectively. Although three ML services and eleven ML models are shown in FIG. 4, any number of ML services and/or ML models can be used for resource mapping.

The ML models can be supervised or unsupervised learning models. Examples of some ML models/algorithms include deep/very deep convolutional neural networks (CNN), such as Inception-v4 and ResNet-50, long short term memory (LSTMs), reinforcement models, support vector machine (SVM), k-nearest neighbor (kNN), regression, random forest, decision tree, naïve bayes, k-means, etc. The ML models can require inputs from (or invoke) additional ML models. Each ML model can include dozens or hundreds of inner layers.

FIGS. 5A-5D illustrate examples of model-resource matrices for some ML services according to one embodiment. For example, matrix 501 having models 1-5 can correspond to service A and the face detection, age/gender recognition, head pose estimation, emotions recognition, and facial landmarks ML models, respectively. Matrix 503 having models 6-8 can correspond to service B and the person detection, person attributes recognition, and person re-identification ML models, respectively. Matrix 505 having models 9-11 can correspond to service C and the vehicle and license plate detection, license plate recognition, and vehicle attributes recognition ML models, respectively. Matrix 507 with models 1-11 can correspond to the combination of services A-C and their corresponding ML models.

Figure 6A:
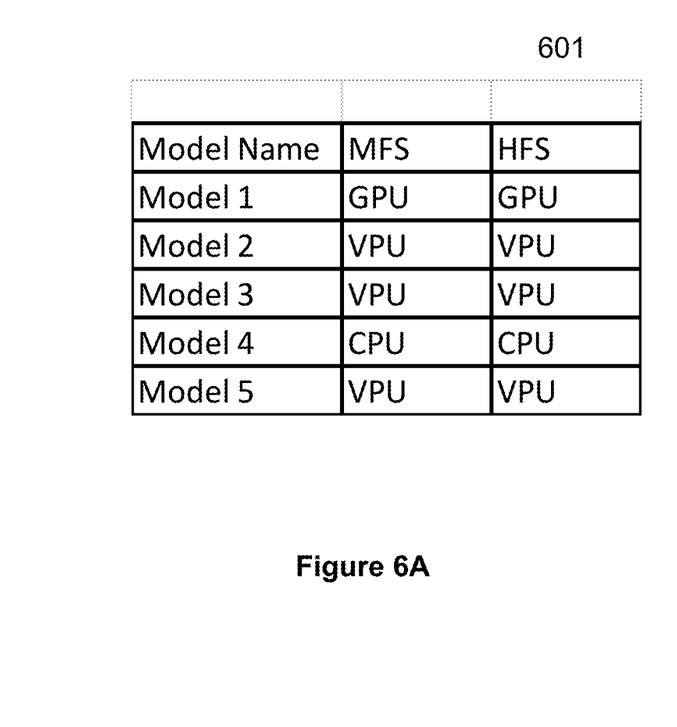
FIG. 6A illustrates an example of model-resource mappings for MFS and HFS according to one embodiment.
Figure 6B:
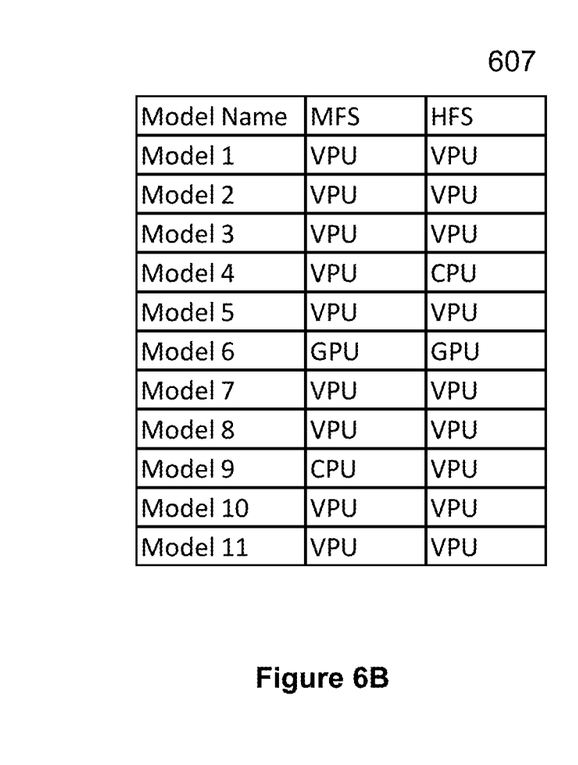
FIG. 6B illustrates another example of model-resource mappings for MFS and HFS according to one embodiment.

FIGS. 6A-6B illustrate examples of model-resource mappings 601, 607 for MFS and HFS according to some embodiments. For example, mappings 601 can correspond to service-specific MFS and HFS determinations for the service A using matrix 501 of FIG. 5A. As shown, for the MFS or HFS, model 4 is mapped to CPU, model 1 is mapped to GPU, and the rest of the models (e.g., 2-3, 5) are mapping to VPUS.

Mappings 607 can correspond to service-agnostic MFS and HFS determinations using matrix 507 of FIG. 5C. As shown, for the MFS, model 9 is mapped to CPU, model 6 is mapped to GPU, and the rest of the models (e.g., 1-5, 7-8, 10-11) are mapping to VPUs. For the HFS, model 4 is mapped to CPU, model 6 is mapped to GPU, and the rest of the models (e.g., 1-3, 5, 7-11) are mapping to VPUs.

Figure 7:
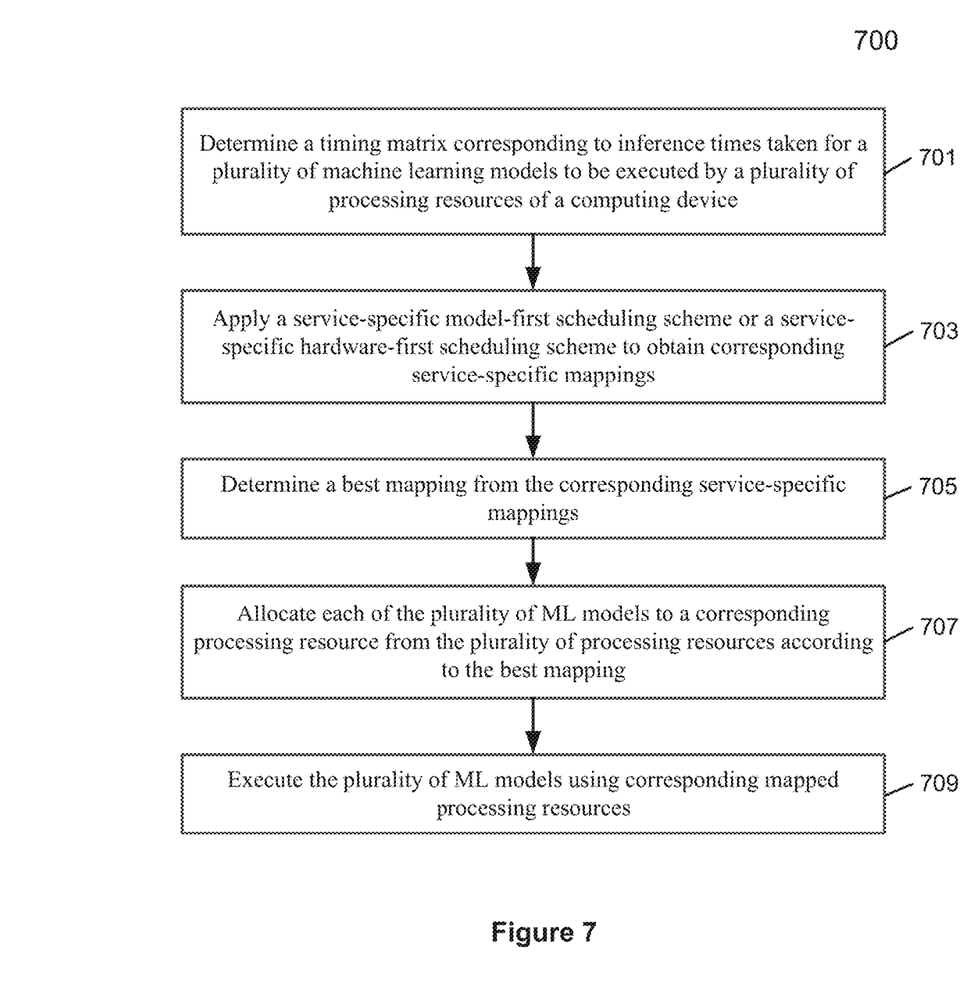
FIG. 7 is a flow diagram illustrating a method according to one embodiment.

FIG. 7 is a flow diagram illustrating a method according to one embodiment. Process 700 may be performed by processing logic which may include software, hardware, or a combination thereof. For example, process 700 may be performed by computing system 101 of FIG. 1.

At block 701, processing logic determines a timing matrix corresponding to inference times taken for a plurality of machine learning (ML) models to be executed by a plurality of processing resources of a computing device. The plurality of processing resources includes at least a first and a second type of processing resources (e.g., CPU, GPU, TPU, VPU, FPGA, etc.).

For example, the timing matrix can correspond to matrix 501 of FIG. 5A corresponding to service A. In one embodiment, the most frequently used service/application (e.g., by the number of historical runs for a predetermined period (weeks, months, etc.)) can be used to determine the timing matrix. In one embodiment, if no indication of historical usage is available, the timing matrix can be a service-agnostic matrix, such as matrix 507 of FIG. 5D.

At block 703, processing logic applies a service-specific model-first scheduling scheme (MFS) or a service-specific hardware-first scheduling scheme (HFS) based on the timing matrix to obtain corresponding service-specific mappings.

For example, processing logic applies a MFS, as described in FIG. 2, to determine a MFS mapping that maps the models to available processing resources. Processing logic then applies a HFS, as described in FIG. 3, to determine a HFS mapping that maps the models to available processing resources.

If it is determined service A is most frequently executed, matrix 501 can be used as the service-specific timing matrix. Processing logic then determines the MFS and HFS mappings for service A as that shown in FIG. 6A.

At block 705, processing logic determines a best mapping from the corresponding service-specific mappings.

In one embodiment, the best mapping can be determined by the lowest average inference latency (or highest FPS) of the two mappings. For example, an average FPS for MFS is: avg(37+399+345+265+317). An average FPS for MFS is: avg(37+399+345+265+317). The scheme with the highest average FPSs is then the best mapping. Since MFS and HFS have the same average FPSs, either one can be selected as the best mapping.

At block 707, processing logic schedules each of the plurality of ML models to a corresponding processing resource from the plurality of processing resources according to the best mapping. For example, depending on the implementation of the computing device, a configuration file can be used to indicate if a model is executed with either a CPU, GPU, VPU, TPU, FPGA, or the like. In one embodiment, a static configuration file can be preconfigured according to the mapping prior to the execution time of the ML application/service. In another embodiment, the mapping configuration is dynamically allocated, by the ML application/service, during a runtime to map the ML models to processing resources according to the desired mapping.

At block 709, processing logic executes the plurality of ML models using corresponding mapped processing resources. For example, the ML models are executed to perform inference tasks. In one embodiment, the ML models are executed concurrently by the mapped processing resources. In one embodiment, the ML models are executed according to availability of the processing resources.

In one embodiment, processing logic further applies a multi-service model first scheduling scheme (e.g., MFS) or a multi-service hardware first scheduling scheme (e.g., HFS) to obtain corresponding multi-service mappings and determines the best mapping from the corresponding service-specific mappings and the corresponding multi-service mappings.

For example, matrix 507 of FIG. 5C can be used as a timing matrix where multiple services (e.g., services A-C) are used to evaluate whether the MFS or HFS scheme is best. Here, the multi-service MFS/HFS mappings are shown in FIG. 6B, the average FPS for the multi-service MFS is: avg(12+399+345+185+317+117+168+111+65+406+154) =207.18. The average FPS for the multi-service HFS is: avg(12+399+345+265+317+117+168+111+37+406+154) =211.91.

The service-specific MFS/HFS are shown in FIG. 6A, and the average FPS for the service-specific MFS is, in this example: avg(37+399+345+265+317)=272.6. The average FPS for the service-specific HFS is: avg(37+399+345+265+317)=272.6. From the service-specific MFS/HFS and multi-service MFS/HFS average values, the service-specific MFS or service-specific HFS has a highest average FPS and is, thus, the best mapping.

In one embodiment, applying a service-specific model-first scheduling scheme includes applying a model-first scheduling scheme limiting the plurality of ML models (e.g., models 1-5) to a particular ML service (e.g., service A), and applying a multi-service model-first scheduling scheme includes applying the model-first scheduling scheme limiting the plurality of ML models (e.g., models 1-11) to a plurality of ML services (e.g., services A-C).

Figure 8:
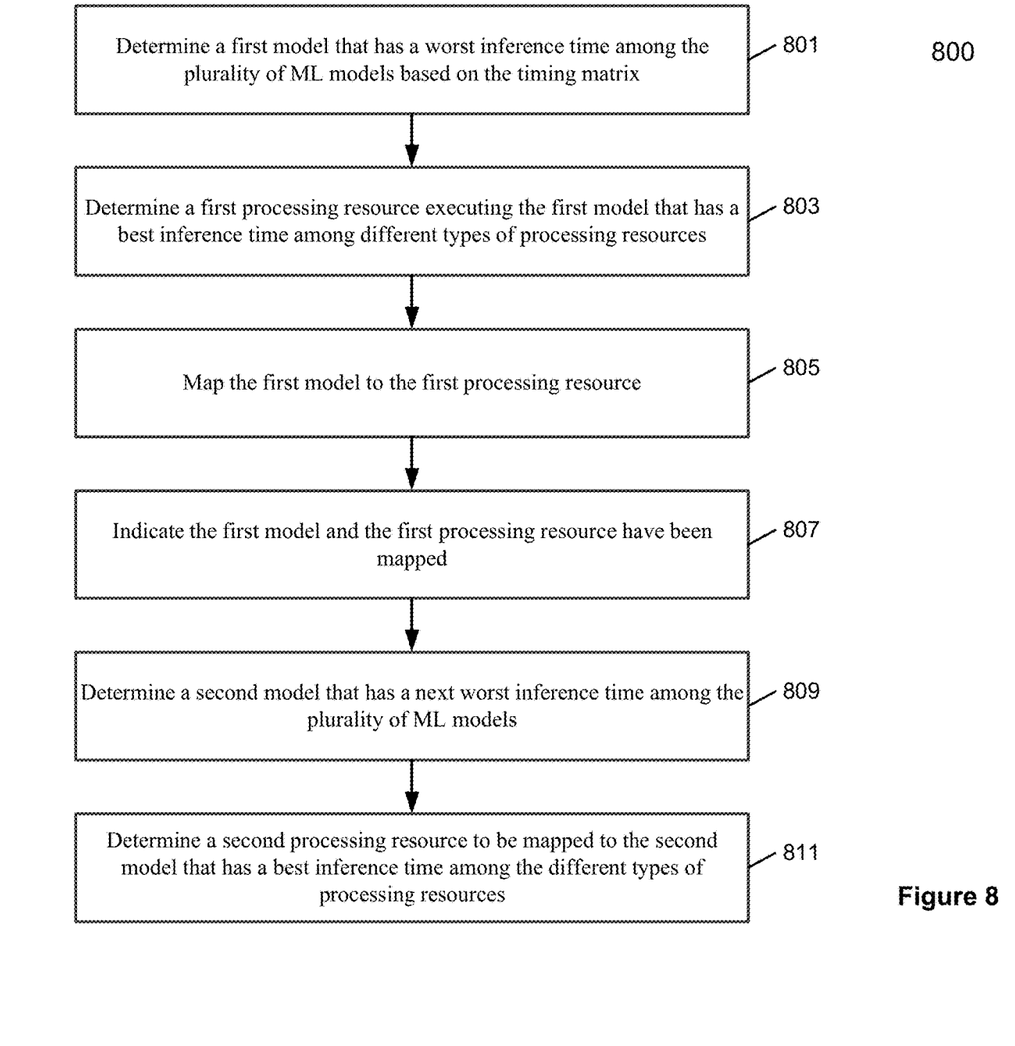
FIG. 8 is a flow diagram illustrating a method according to one embodiment.

FIG. 8 is a flow diagram illustrating a method according to one embodiment. Process 800 may be performed by processing logic which may include software, hardware, or a combination thereof. For example, process 800 may be performed by computing system 101 of FIG. 1. Process 800 can correspond to process 200 of FIG. 2.

At block 801, processing logic determines a first model (e.g., model 1) that has a worst inference time (e.g., 8 FPS) among the plurality of ML models (e.g., models 1-5) based on the timing matrix (e.g., matrix 501 of FIG. 5A).

At block 803, processing logic determines a first processing resource (e.g., GPU) executing the first model (model 1) that has a best inference time (e.g., 37 FPS) among different types of processing resources (e.g., CPU, GPU, VPU).

At block 805, processing logic maps the first model (e.g., model 1) to the first processing resource (e.g., GPU). At block 807, processing logic indicates (marks as unavailable) the first model and the first processing resource have been mapped.

At block 809, processing logic determines a second model (e.g., model 4) that has a next worst inference time (e.g., 185 FPS) among the plurality of ML models (e.g., models 2-5). At block 811, processing logic determines a second processing resource (e.g., CPU) to be mapped to the second model (model 4) that has a best inference time (e.g., 265 FPS) among the different types of processing resources (e.g., CPU, VPU).

In one embodiment, applying a service-specific hardware-first scheduling scheme includes applying a hardware-first scheduling scheme limiting the plurality of ML models to a particular ML service, and applying a multi-service hardware-first scheduling scheme includes applying the hardware-first scheduling scheme limiting the plurality of ML models to a plurality of services.

Figure 9:
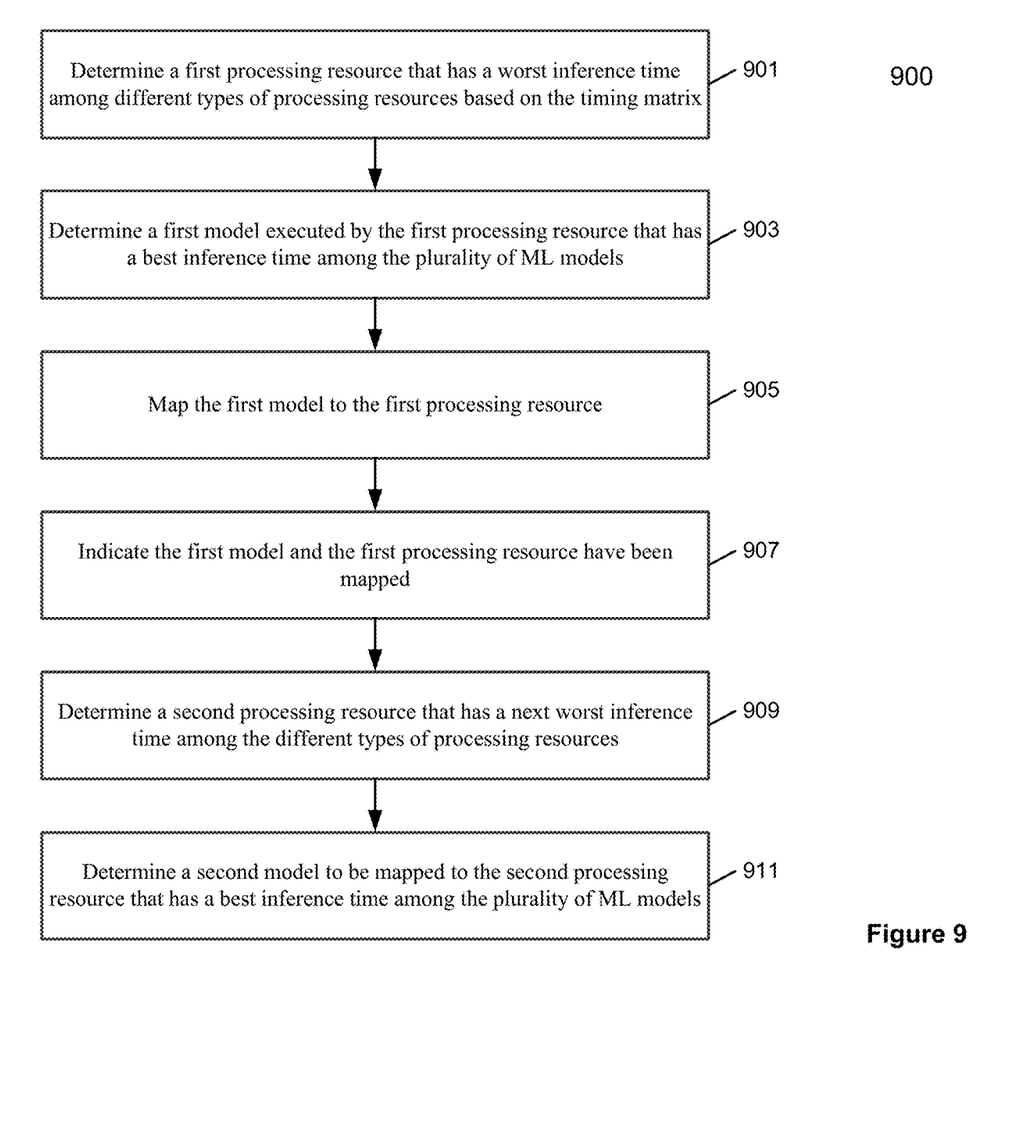
FIG. 9 is a flow diagram illustrating a method according to one embodiment.

FIG. 9 is a flow diagram illustrating a method according to one embodiment. Process 900 may be performed by processing logic which may include software, hardware, or a combination thereof. For example, process 900 may be performed by computing system 101 of FIG. 1. Process 900 can correspond to process 300 of FIG. 3.

At block 901, processing logic determines a first processing resource (e.g., CPU) that has a worst inference time (e.g., 8 FPS) among the plurality of ML models (e.g., models 1-5) based on the timing matrix (e.g., matrix 501 of FIG. 5A). At block 903, processing logic determines a first model (e.g., model 4) executed by the first processing resource (e.g., CPU) that has a best inference time (e.g., 265 FPS) among the plurality of ML models (e.g., models 1-5).

At block 905, processing logic maps the first model (model 4) to the first processing resource (e.g., CPU). At block 907, processing logic indicates (marks as unavailable) the first model and the first processing resource have been mapped. At block 909, processing logic determines a second processing resource (e.g., VPU) that has a next worst inference time (e.g., 12 FPS) among the different types of processing resources (e.g., GPU, VPU).

At block 911, processing logic determines a second model (e.g., model 2) to be mapped to the second processing resource (e.g., VPU) that has a best inference time (e.g., 399 FPS) among the different types of processing resources (e.g., GPU, VPU).

In one embodiment, the plurality of processing resources includes a central processing unit (CPU), graphic processing unit (GPU), or vision processing unit (VPU). In one embodiment, the computing device includes an edge device, a smart phone, or an internet of things (IOT) device. In one embodiment, the ML services includes face detection, person detection, or vehicle detection services.

In one embodiment, face detection includes age/gender recognition, emotions recognition, facial landmarks, head pose estimation, or person attributes recognition; person detection includes person attribution recognition and person re-identification; vehicle detection includes license plate recognition and vehicle attribute recognition ML models.

In one embodiment, a default mapping allocates each of the ML models with the processing resources in a default order of CPU, GPU, and VPU, according to their availability. Here, the default mapping may not be optimized and the inference latency may vary from time to time. Furthermore, the default mapping may add substantial inference latency to the computing device executing the ML models.

Figure 10:
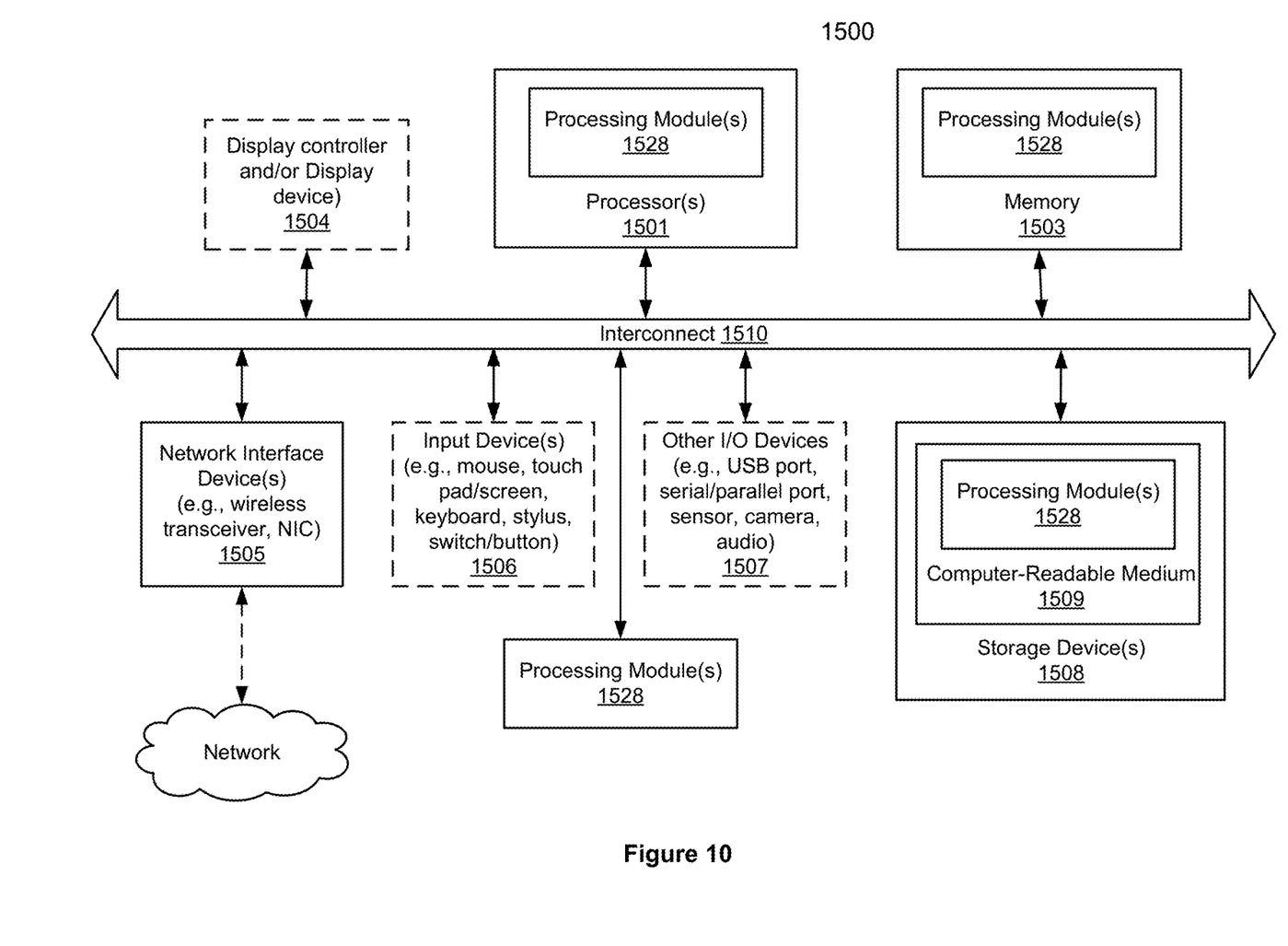
FIG. 10 is a block diagram illustrating a data processing system according to one embodiment.

FIG. 10 is a block diagram illustrating a data processing system according to one embodiment. For example, system 1500 may represent computing device 101 of FIG. 1.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC).

Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft® Mac OS®/iOS® from Apple, Android® from Google®, Linux®, Unix®, or other real-time or embedded operating systems such as VXWORKS.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a BLUETOOTH transceiver, a WIMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, resource mapping system 110 as described in FIG. 1. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store at least some of the software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   determining a timing matrix corresponding to inference times taken for a plurality of machine learning (ML) models to be executed by a plurality of processing resources of a computing device, wherein the plurality of processing resources comprises at least a first and a second type of processing resources;
   applying a service-specific model-first scheduling scheme or a service-specific hardware-first scheduling scheme based on the timing matrix to obtain corresponding service-specific mappings;
   determining a best mapping from the corresponding service-specific mappings;
   scheduling each of the plurality of ML models to a corresponding processing resource from the plurality of processing resources according to the best mapping; and
   executing the plurality of ML models using corresponding mapped processing resources.

2. The method of claim 1, further comprising:
   applying a multi-service model first scheduling scheme or a multi-service hardware first scheduling scheme to obtain corresponding multi-service mappings; and
   determining the best mapping from the corresponding service-specific mappings and the corresponding multi-service mappings.

3. The method of claim 1, wherein applying a service-specific model-first scheduling scheme comprises applying a model-first scheduling scheme limiting the plurality of ML models to a particular ML service, and wherein applying a multi-service model-first scheduling scheme comprises applying the model-first scheduling scheme limiting the plurality of ML models to a plurality of ML services.

4. The method of claim 3, wherein applying the model-first scheduling scheme comprises:
   determining a first model that has a worst inference time among the plurality of ML models based on the timing matrix;
   determining a first processing resource executing the first model that has a best inference time among different types of processing resources;
   mapping the first model to the first processing resource;
   indicating the first model and the first processing resource have been mapped;
   determining a second model that has a next worst inference time among the plurality of ML models; and
   determining a second processing resource to be mapped to the second model that has a best inference time among the different types of processing resources.

5. The method of claim 1, wherein applying a service-specific hardware-first scheduling scheme comprises applying a hardware-first scheduling scheme limiting the plurality of ML models to a particular ML service, and wherein applying a multi-service hardware-first scheduling scheme comprises applying the hardware-first scheduling scheme limiting the plurality of ML models to a plurality of services.

6. The method of claim 5, wherein applying the hardware-first scheduling scheme comprises:
   determining a first processing resource that has a worst inference time among different types of processing resources based on the timing matrix;
   determining a first model executed by the first processing resource that has a best inference time among the plurality of ML models;
   mapping the first model to the first processing resource;
   indicating the first model and the first processing resource have been mapped;
   determining a second processing resource that has a next worst inference time among the different types of processing resources; and determining a second model to be mapped to the second processing resource that has a best inference time among the plurality of ML models.

7. The method of claim 1, wherein the plurality of processing resources includes a central processing unit (CPU), graphic processing unit (GPU), or vision processing unit (VPU).

8. The method of claim 1, wherein the computing device is an edge device, a smart phone, or an internet of things (IoT) device.

9. The method of claim 1, wherein a plurality of ML services comprises face detection, person detection, or vehicle detection services.

10. The method of claim 1, wherein face detection comprises age/gender recognition, emotions recognition, facial landmarks, head pose estimation, or person attributes recognition, wherein person detection comprises person attribution recognition and person re-identification, wherein vehicle detection comprises license plate recognition and vehicle attribute recognition ML models.

11. The method of claim 1, wherein a default mapping allocates each of the plurality of ML models with the plurality of processing resources in a default order of CPU, GPU, and VPU, according to their availability.

12. A non-transitory machine-readable medium having instructions stored therein, which when executed by a processor, cause the processor to perform operations, the operations comprising:
   determining a timing matrix corresponding to inference times taken for a plurality of machine learning (ML) models to be executed by a plurality of processing resources of a computing device, wherein the plurality of processing resources comprises at least a first and a second type of processing resources;
   applying a service-specific model-first scheduling scheme or a service-specific hardware-first scheduling scheme based on the timing matrix to obtain corresponding service-specific mappings;
   determining a best mapping from the corresponding service-specific mappings;
   scheduling each of the plurality of ML models to a corresponding processing resource from the plurality of processing resources according to the best mapping; and
   executing the plurality of ML models using corresponding mapped processing resources.

13. The non-transitory machine-readable medium of claim 12, wherein the operations further comprise:
   applying a multi-service model first scheduling scheme or a multi-service hardware first scheduling scheme to obtain corresponding multi-service mappings; and
   determining the best mapping from the corresponding service-specific mappings and the corresponding multi-service mappings.

14. The non-transitory machine-readable medium of claim 12, wherein applying a service-specific model-first scheduling scheme comprises applying a model-first scheduling scheme limiting the plurality of ML models to a particular ML service, and wherein applying a multi-service model-first scheduling scheme comprises applying the model-first scheduling scheme limiting the plurality of ML models to a plurality of ML services.

15. The non-transitory machine-readable medium of claim 14, wherein applying the model-first scheduling scheme comprises:
   determining a first model that has a worst inference time among the plurality of ML models based on the timing matrix;
   determining a first processing resource executing the first model that has a best inference time among different types of processing resources;
   mapping the first model to the first processing resource;
   indicating the first model and the first processing resource have been mapped;
   determining a second model that has a next worst inference time among the plurality of ML models; and
   determining a second processing resource to be mapped to the second model that has a best inference time among the different types of processing resources.

16. The non-transitory machine-readable medium of claim 12, wherein applying a service-specific hardware-first scheduling scheme comprises applying a hardware-first scheduling scheme limiting the plurality of ML models to a particular ML service, and wherein applying a multi-service hardware-first scheduling scheme comprises applying the hardware-first scheduling scheme limiting the plurality of ML models to a plurality of ML services.

17. The non-transitory machine-readable medium of claim 16, wherein applying the hardware-first scheduling scheme comprises:
   determining a first processing resource that has a worst inference time among different types of processing resources based on the timing matrix;
   determining a first model executed by the first processing resource that has a best inference time among the plurality of ML models;
   mapping the first model to the first processing resource;
   indicating the first model and the first processing resource have been mapped;
   determining a second processing resource that has a next worst inference time among the different types of processing resources; and
   determining a second model to be mapped to the second processing resource that has a best inference time among the plurality of ML models.

18. A data processing system, comprising:
   a processor; and
   a memory coupled to the processor to store instructions, which when executed by the processor, cause the processor to perform operations, the operations including
      determining a timing matrix corresponding to inference times taken for a plurality of machine learning (ML) models to be executed by a plurality of processing resources of a computing device, wherein the plurality of processing resources comprises at least a first and a second type of processing resources;
      applying a service-specific model-first scheduling scheme or a service-specific hardware-first scheduling scheme based on the timing matrix to obtain corresponding service-specific mappings;
      determining a best mapping from the corresponding service-specific mappings;
      scheduling each of the plurality of ML models to a corresponding processing resource from the plurality of processing resources according to the best mapping; and
      executing the plurality of ML models using corresponding mapped processing resources.

19. The data processing system of claim 18, wherein the operations further comprise:

applying a multi-service model first scheduling scheme or a multi-service hardware first scheduling scheme to obtain corresponding multi-service mappings; and determining the best mapping from the corresponding service-specific mappings and the corresponding multi-service mappings.

20. The data processing system of claim 18, wherein applying a service-specific model-first scheduling scheme comprises applying a model-first scheduling scheme limiting the plurality of ML models to a particular ML service, and wherein applying a multi-service model-first scheduling scheme comprises applying the model-first scheduling scheme limiting the plurality of ML models to a plurality of ML services.

* * * * *